Aug. 3, 1965  C. H. MUEHLHAUSEN  3,198,356
BALE GUIDING MEANS
Filed March 19, 1962  2 Sheets-Sheet 1
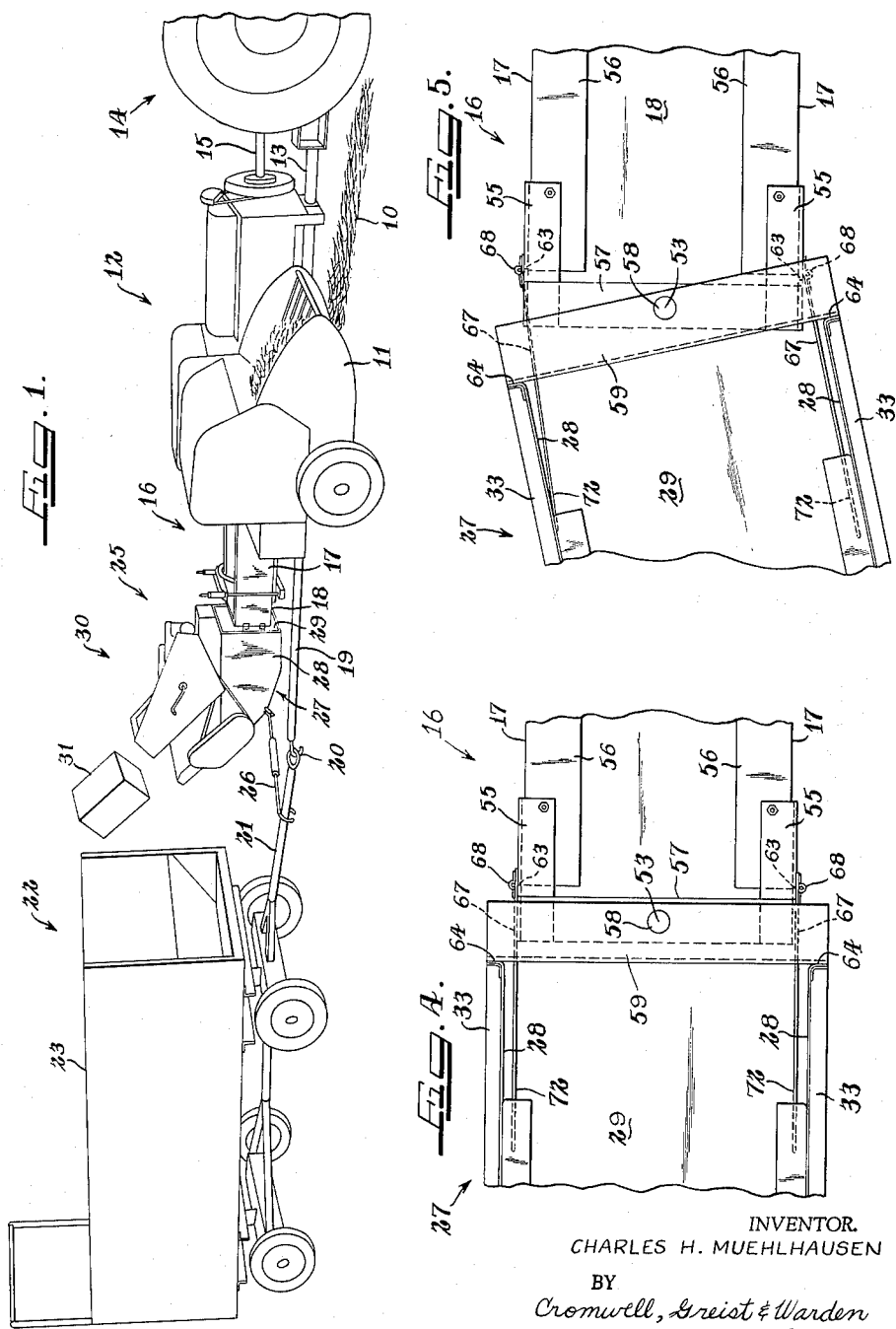
INVENTOR.
CHARLES H. MUEHLHAUSEN
BY
Cromwell, Greist & Warden
Attys.

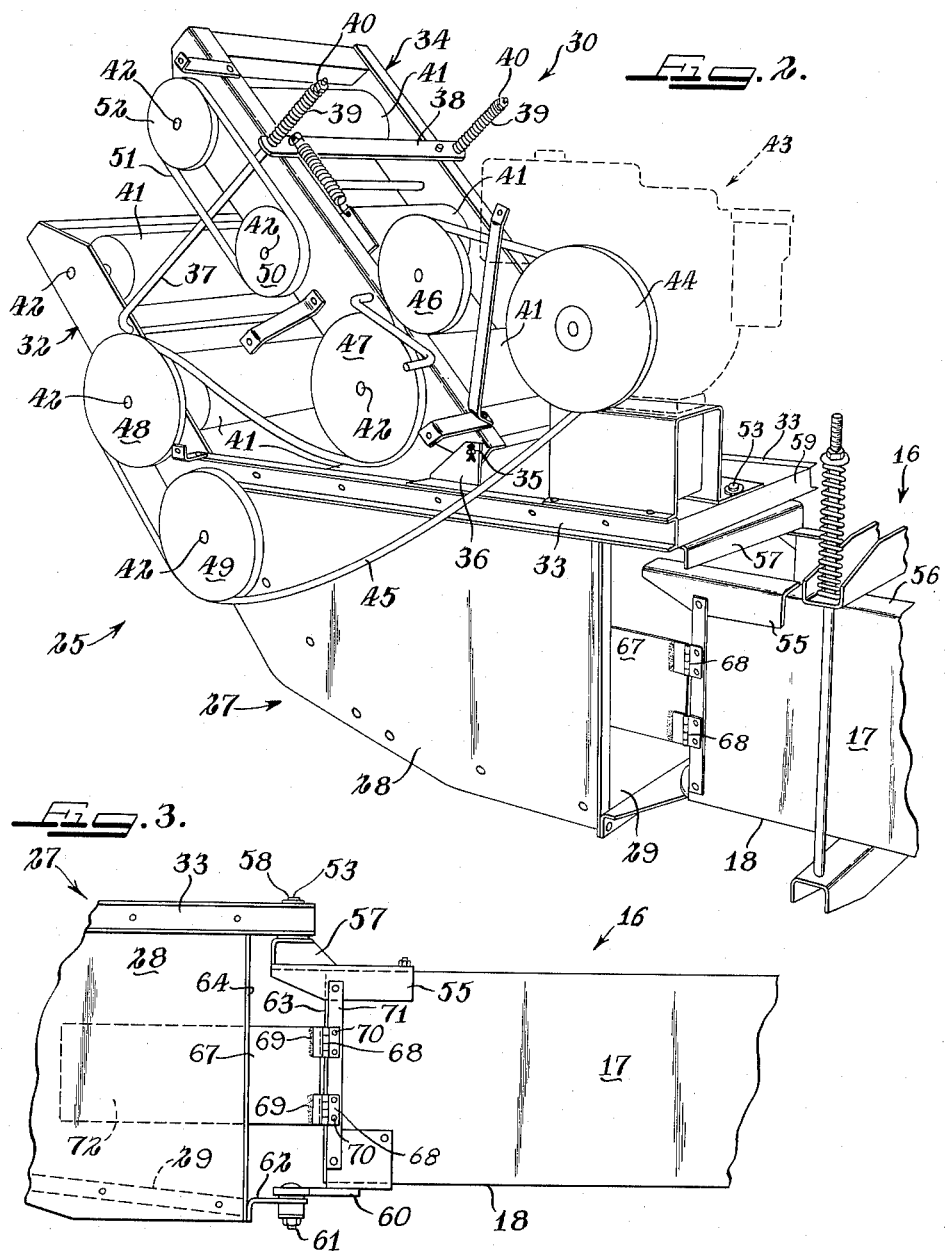

3,198,356
BALE GUIDING MEANS
Charles H. Muehlhausen, Shelbyville, Ill., assignor to Oliver Corporation, Chicago, Ill., a corporation of Delaware
Filed Mar. 19, 1962, Ser. No. 180,732
1 Claim. (Cl. 214—83.3)

This invention relates, generally, to devices for baling hay and the like and it has particular relation to means for guiding a bale from a bale chamber on a hay baler to a bale receiving chamber on the bale thrower pivotally mounted on the rear of the hay baler.

When a bale thrower is pivotally mounted on the rearwardly discharging end of a hay baler, it is desirable that provision be made for effecting the smooth transition of the bale from the bale chamber on the baler to the bale receiving chamber on the bale thrower. An important reason for this is to insure that there is no interference with this transfer. Another reason is to minimize the damage to the adjacent surfaces of the chambers on the baler and thrower through which the bale moves.

Among the objects of this invention are: To provide for guiding a bale in its movement from a bale chamber on a hay baler to a bale receiving chamber on a pivotally mounted bale thrower in a new and improved manner; and to accomplish this by hingedly mounting guide plates along the rear edges of the side walls of the bale chamber to swing about vertical axes with the plates extending into the bale receiving chamber in overlying relation to its vertical side walls and unattached thereto.

In the drawings:

FIG. 1 is a perspective view of the portion of a tractor hauling a hay baler provided with a pivotally mounted bale thrower arranged to discharge bales of hay into a following wagon.

FIG. 2 is a perspective view, at an enlarged scale, of the bale thrower shown in FIG. 1, the guards or covers for certain of the mechanism being removed in order to show more clearly the details of construction.

FIG. 3 is a vertical elevational view of the left end portion of the bale chamber on the hay baler and the right end portion of the bale receiving chamber on the bale thrower.

FIG. 4 is a top plan view of that portion of the construction shown in FIG. 3 with the bale thrower being shown in endwise alignment with the bale chamber on the rear end of the hay baler.

FIG. 5 is a view, similar to FIG. 4, but showing the bale thrower angularly related to the bale chamber on the hay baler, this relationship occurring when the tractor and hay baler move out of a generally forwardly direction to one side thereof.

Referring now particularly to FIG. 1 of the drawings, it will be observed that the reference character 10 designates a windrow of mown hay that is arranged to be picked up by a catcher 11 on a hay baler, shown generally at 12, which is arranged to be drawn by a draw bar 13 extending from a tractor a portion of which is indicated, generally, at 14. A power take-off 15 interconnects the tractor 14 and the hay baler 12 for the purpose of operating the latter in known manner. While the present invention is described particularly for baling hay, it will be understood that it can be employed for baling other like material such as straw.

The construction of the hay baler 12 is conventional and it includes a rearwardly extending bale chamber, indicated generally at 16, which is defined by vertical side walls one of which is shown at 17 and a bottom wall 18.

It will be understood that the hay is compressed by the hay baler 12 into a bale that may have a generally square cross section and is substantially longer than it is wide.

It is desirable to provide for automatically picking up the bales of hay after they are discharged from the bale chamber 16. For this purpose a wagon hitch tube 19 extends rearwardly from the hay baler 12 and is detachably connected at 20 to the forward end of a tongue 21 that extends from a wagon, shown generally at 22, having a relatively large body 23 for receiving the bales of hay.

In order to transport the bales of hay from the bale chamber 16 as they are formed by the hay baler 12 a bale thrower, shown generally at 25, is pivotally mounted on the rear end of the bale chamber 16. A wagon guide arm 26 is secured to the lower rear portion of the bale thrower 25 and it has a sliding connection with the tongue 21 of the wagon 22 for the purpose of swinging the bale thrower 25 on its pivotal mounting on the bale chamber 16 so that it will be aligned with the body 23 of the wagon 22 at all times.

The bale thrower 25 is provided with a bale receiving chamber that is indicated, generally, at 27. It is formed by vertical side walls one of which is indicated at 28 the forward edges of which are spaced rearwardly and outwardly from the rear edges of the vertical side wall 17 of the bale chamber 16. The bale receiving chamber 27 also is formed by a bottom wall 29 which is located at substantially the same elevation as the bottom wall 18 of the bale chamber 16, it being positioned slightly below it in order to facilitate receipt of the tied bale from the bale chamber 16 by the bale receiving chamber 27. As pointed out, the vertical side walls 28 of the bale receiving chamber 27 are spaced outwardly from the vertical side walls 17 of the bale chamber 16. Also, the bottom wall 29 is correspondingly wider than the width of the bottom wall 18 of the bale chamber 16. The reason for this construction is to permit the bale thrower 25 and its bale receiving chamber 27 to be positioned angularly with respect to the bale chamber 16 for the purpose of receiving tied bales when the wagon 22 and the bale thrower 25 are angularly positioned with respect to the direction of forward travel of the hay baler 12 and tractor 14.

Extending upwardly and rearwardly from the bale receiving chamber 27 is a bale throwing mechanism that is indicated, generally, at 30. As will be described presently the bale throwing mechanism 30 is arranged to accelerate a tied bale 31 rearwardly and upwardly with sufficient force to throw it into the body 23 of the wagon 22. Thus it is unnecessary to employ more than a single operator who operates the tractor 14 for gathering hay from the windrow 10, baling it and loading the tied bales in a wagon for transport to a suitable storage area.

Referring now particularly to FIG. 2 of the drawings, it will be observed that the details of construction of the bale thrower 25 are shown more clearly. Here it will be observed that the bale throwing mechanism 30 includes a lower frame member, shown generally at 32, and rigidly mounted on horizontally extending channel frame members 33—33 which extend along the upper sides of the vertical side walls 28. The lower frame member 32 is inclined upwardly and overlying it in a similarly inclined position is an upper frame member that is shown, generally, at 34. The upper frame member 34 is pivoted at 35 on plates, one of which is shown at 36, that are secured to the upper flanges of the channel frame members 33—33. A yoke 37 is pivotally mounted on upstanding portions of the lower frame member 32 and its arms extend through suitable openings in a transverse bar 38 that is secured to the upper side of the upper frame member 34.

Coil compression springs 39—39 are provided on the upper ends of the arms of the yoke 37 between the upper side of the transverse bar 36 and nuts 40—40 threaded on the upper ends of the arms of the yoke 37 for the purpose of biasing the upper frame member 34 downwardly. Suitable stop means (not shown) serve to limit the downward movement of the upper frame member 34 and parts mounted thereon.

It will be understood that the tied bale is moved from the bale chamber 16 into the bale receiving chamber 27. Then it is picked up by drive rolls 41 three of which are rotatably mounted on the lower frame member 32 with another three drive rolls 41 being rotatably mounted on the upper frame member 34. Each of the drive rolls 41 is mounted on a shaft 42 and the several shafts 42 are suitably journaled in the frame members 32 and 34 and provision is made for rotating them so that they pick up a tied bale from the bale receiving chamber 27 as it moves into engagement with the lowermost pair of drive rolls 41—41 on the lower and upper frame members 32 and 34 by the next bale being forced through the bale chamber 16. The drive rolls 41 are rotated in such directions as to move the tied bale upwardly therethrough. The upper and lower sides of the tied bale are gripped by the drive rolls and, since the upper frame member 34 is spring loaded by the springs 39—39, the bale is tightly gripped and they increase the velocity of the bale until it reaches such a velocity that it can be thrown, as indicated by the bale 31 in FIG. 1, from the bale throwing mechanism 30 into the body 23 of the wagon 22.

In order to rotate the drive rolls 41 in the manner described an internal combustion engine shown by a broken line outline and indicated, generally, at 45 is mounted on the forward end of the bale thrower 25. It will be understood that any suitable power source can be employed other than the internal combustion engine 43. It is arranged to drive a pulley 44 over which a V-belt 45 is trained. The belt 45 extends over an idler pulley 46 that is suitably rotatably mounted on the upper frame member 34. Then it extends over a pulley 47 on the shaft 42 that carries the lowermost drive roll 41 on the upper frame member 34. The V-belt 45 continues over a pulley 48 on the shaft 42 of the intermediate drive roll 41 on the lower frame member 32. At its other end this drive roll is provided with a V-belt drive (not shown) for rotating the uppermost drive roll 41 on the lower frame member 32. The belt 45 continues over the pulley 49 on the shaft 42 which carries the lowermost drive roll 41 on the lower frame member 32. At the opposite end of the shaft 42 from that shown in FIG. 2 for the lowermost drive roll 41 on the upper frame member 34 a V-belt drive (not shown) is provided for driving the intermediate drive roll 41 on the upper frame member 34. The shaft 42 of this intermediate drive roll is provided with a pulley 50 which drives through a V-belt 51 to a pulley 52 on the shaft 42 of the uppermost drive roll 41 on the upper frame member 34. It will be understood that the drive rolls 41 are operated at such peripheral speeds that the tied bale conveyed therebetween is accelerated to such a velocity that its trajectory from the bale throwing mechanism 30 is such as to carry it into the body 23 of the wagon 22. Since the bale thrower 25 is pivotally mounted at 53 about a vertical axis on the rear end of the bale chamber 16 and since the wagon guide arm 26 swings the bale thrower 25 to direct the tied bales into the body 23 of the wagon 22, the bales are successively thrown into the wagon 22 as the operation proceeds.

FIGS. 3, 4 and 5 show in more detail the pivot mounting 53 of the bale thrower 25 on the rear end of the bale chamber 16. Here it will be observed that angle shaped brackets 55—55 are secured to the upper sides of the vertical side walls 17—17 with the upper flanges overlying inturned flanges 56—56. Extending transversely between the angle shaped brackets 55 is a transverse angle bracket 57 from which a pivot pin 58 extends upwardly to provide a part of the pivot mounting 53 previously referred to. The pivot pin 58 is journaled in a transverse end member 59 which extends between the channel frame members 33—33. Another part of the pivot mounting 53 is provided by a plate 60 which underlies the rear portion of the bottom wall 18 of the bale chamber 16 and has a bolt 61 extending downwardly therethrough and through the forward end of a clip 62 which extends from the forward edge of the bottom wall 29 of the bale receiving chamber 27.

Now it will be observed that the rear edges 63—63 of the vertical side walls 17—17 on the bale chamber 16 are spaced forwardly and inwardly of the front edges 64—64 of the vertical side walls 28—28 at opposite sides of the bale receiving chamber 27. This arrangement is necessary in order to permit the bale receiving chamber 27 to shift with the bale thrower 25 from side to side and, for example, as shown in FIG. 5. At one side the distance between the rear edges 63 and 64 is increased while at the other side the distance therebetween is decreased. However, it is necessary that the bale be guided so as to have a smooth transition from the bale chamber 16 into the bale receiving chamber 27. For this purpose guide plates 67—67 are provided. At their forward ends they are mounted on hinges 68—68. One portion of each of the hinges 68—68 is welded at 69—69 to the respective guide plates 67 while the other portion of each of the hinges 68—68 is secured by rivets 70—70 to straps 71 which extend vertically along the rear edges 63—63 of the vertical side walls 17—17.

The guide plates 67—67 have portions 72—72 which extend well into the bale receiving chamber 27 to overlie the vertical side walls 28—28 thereof for the purpose of guiding each bale from the bale chamber 16 into the bale receiving chamber 27.

It will be seen that certain changes may be made with respect to the guide plates 67—67 and their mounting without departing from the invention. Thus, the width of these plates could be changed, or several narrow guide plates could be mounted in vertically spaced relationship. Various types of hinges can be used.

What is claimed as new is:

In apparatus for baling hay and the like comprising: baling means arranged and adapted to be transported in a forward direction, to compress hay into a bale, and to move the same rearwardly into a bale chamber having vertically extending side walls and a bottom wall; a bale thrower pivotally supported on said bale chamber rearwardly thereof to rotate about a vertical axis and having a chamber for receiving a bale from said bale chamber, said bale receiving chamber having vertically extending side walls the forward edges of which are spaced rearwardly and outwardly from the rear edges of said side walls of said bale chamber and a bottom wall substantially at the elevation of said bottom wall of said bale chamber, said bale thrower being adapted to convey a bale from said bale receiving chamber and throw it into a following wagon having an articulate connection to said baling means, and means for causing said bale thrower to pivot in accordance with the position of said wagon; the improvement in said apparatus which comprises means for guiding a bale from said bale chamber into said bale receiving chamber including a pair of guide plates having forward ends mounted to the outside of respective side walls of said bale chamber adjacent said rear edges thereof by pivot means for swinging movement of each guide plate about a vertical axis, said guide plates extending freely rearwardly into said bale receiving chamber in overlying relation with the inside surfaces of respective side walls thereof and being of sufficient length to span the horizontal distance between said respective side walls in any position to which said bale thrower is rotatable with respect to said baling means to guide each bale from said bale chamber on said baling means into said bale receiving chamber on said bale throwing means, said pivot means constituting the sole means mounting said guide plates.

References Cited by the Examiner
UNITED STATES PATENTS

| | | | |
|---|---|---|---|
| 1,888,868 | 11/32 | Schroder | 198—8 |
| 2,358,849 | 9/44 | Cartlidge | 198—8 |
| 2,756,865 | 7/56 | Morrison | 214—83.3 |
| 3,090,508 | 5/63 | Muth. | |
| 3,132,754 | 5/64 | Smoker. | |

OTHER REFERENCES

Service Catalog on the New Holland Bale Thrower, Models 49–52, issued December 1961 and also 1959 and 1960 by the Sperry Rand Corp., pages 10, 11 and 12.

HUGO O. SCHULZ, *Primary Examiner.*

MORRIS TEMIN, *Examiner.*